(12) United States Patent
Tamura (10) Patent No.: US 8,479,857 B2
(45) Date of Patent: Jul. 9, 2013

(54) FUEL CELL POWERED VEHICLE

(75) Inventor: Kouichi Tamura, Hamamatsu (JP)

(73) Assignee: Suzuki Motor Corporation, Hamamatsu-Shi (JP)

( * ) Notice: Subject to any disclaimer, the term of this patent is extended or adjusted under 35 U.S.C. 154(b) by 341 days.

(21) Appl. No.: 12/781,092

(22) Filed: May 17, 2010

(65) Prior Publication Data

US 2010/0300785 A1 Dec. 2, 2010

(30) Foreign Application Priority Data

May 27, 2009 (JP) ................................. 2009-127272

(51) Int. Cl.
*B60K 6/32* (2007.10)

(52) U.S. Cl.
USPC .................... 180/68.5; 180/291; 180/65.31

(58) Field of Classification Search
USPC ..... 180/68.3, 291, 296, 65.1, 65.31; 903/908, 903/944
See application file for complete search history.

(56) References Cited

U.S. PATENT DOCUMENTS

| | | | | |
|---|---|---|---|---|
| 6,648,085 B2 * | 11/2003 | Nagura et al. | ............... | 180/65.1 |
| 6,679,345 B2 * | 1/2004 | Hirayama et al. | ......... | 180/65.31 |
| 6,715,571 B2 * | 4/2004 | Nakamori | .................... | 180/65.1 |
| 6,793,027 B1 * | 9/2004 | Yamada et al. | .............. | 180/65.1 |
| 7,121,366 B2 * | 10/2006 | Horii | ............................ | 180/65.1 |
| 7,195,282 B2 * | 3/2007 | Mizuno | ......................... | 280/830 |
| 7,401,670 B2 * | 7/2008 | Horii et al. | .................. | 180/65.1 |
| 7,699,127 B2 * | 4/2010 | Horii et al. | .................. | 180/65.1 |
| 8,118,129 B2 * | 2/2012 | Ito et al. | ........................ | 180/225 |
| 2004/0050606 A1 * | 3/2004 | Yang et al. | .................... | 180/220 |
| 2006/0037793 A1 * | 2/2006 | Horii et al. | .................. | 180/89.2 |
| 2006/0040144 A1 | 2/2006 | Shimizu et al. | | |
| 2006/0040145 A1 * | 2/2006 | Tokumura et al. | ............. | 429/12 |
| 2006/0040154 A1 * | 2/2006 | Makuta et al. | .................. | 429/26 |
| 2006/0040161 A1 * | 2/2006 | Horii et al. | ...................... | 429/34 |
| 2006/0278452 A1 * | 12/2006 | Shimizu et al. | ............. | 180/68.3 |
| 2007/0074682 A1 * | 4/2007 | Makuta | ........................ | 123/41.1 |
| 2007/0122671 A1 * | 5/2007 | Shimizu et al. | ................ | 429/26 |
| 2008/0093148 A1 * | 4/2008 | Takahashi | .................... | 180/220 |
| 2008/0166607 A1 * | 7/2008 | Muramatsu et al. | ........... | 429/22 |
| 2008/0236914 A1 * | 10/2008 | Horii et al. | .................. | 180/65.3 |
| 2009/0266636 A1 * | 10/2009 | Naegeli | ........................ | 180/205 |
| 2010/0294582 A1 * | 11/2010 | Eguchi et al. | ................ | 180/220 |

FOREIGN PATENT DOCUMENTS

JP 2008-213742 9/2008

OTHER PUBLICATIONS

Extended European Search Report dated Oct. 19, 2010 for corresponding European Patent Application No. 10163889.8.

* cited by examiner

*Primary Examiner* — Katy M Ebner (74) *Attorney, Agent, or Firm* — Barnes & Thornburg LLP (57) ABSTRACT

There are provided a vehicle body, a seat disposed above the vehicle body, a rechargeable battery disposed below the seat, an electric power management device disposed below the seat and behind the rechargeable battery, and a fuel cell disposed below the seat and behind the electric power management device.

10 Claims, 8 Drawing Sheets

FUEL CELL POWERED VEHICLE

CROSS-REFERENCE TO RELATED APPLICATION

This application is based upon and claims the benefit of priority from Japanese Patent Application No. 2009-127272, filed May 27, 2009; the entire contents of which are incorporated herein by reference.

BACKGROUND OF THE INVENTION

1. Field of the Invention

The present invention relates to a fuel cell powered vehicle that travels by using electric power generated by a fuel cell.

2. Description of the Related Art

Development of fuel cell powered vehicles has been underway. A fuel cell powered vehicle includes a fuel tank that stores hydrogen gas or any other suitable substance, a fuel cell stack (hereinafter simply referred to as a fuel cell) that generates electricity in a chemical reaction between fuel and air, more specifically, oxygen in air, a rechargeable battery, and an electric motor that drives a driven wheel.

Many conventional fuel cell systems for four-wheel vehicles generate a relatively large amount of electricity as much as several tens of kilowatts but also produce heat equivalent to the generated electricity. To address the problem, a conventional fuel cell system for a four-wheel vehicle includes a water cooling system having high cooling efficiency. To generate a large amount of electricity, a conventional fuel cell system for a four-wheel vehicle includes a compressor provided to deliver a large amount of air to the fuel cell system.

Fuel cell powered motorcycles as an example of the conventional fuel cell powered vehicle include a water-cooled fuel cell system capable of generating a relatively large amount of electricity. A fuel cell powered motorcycle of this type includes a fuel cell cooling radiator disposed at a front position in a vehicle body, a cooling system disposed behind the radiator and thermally connecting the radiator to a fuel cell and a variety of electric parts, the fuel cell disposed behind the cooling system and below the front end of a seat, and a fuel tank disposed behind the fuel cell and substantially occupying a space below the seat (see Japanese Patent Laid-Open No. 2008-213742, for example).

On the other hand, an air-cooled fuel cell system, which generates a relatively small amount of electricity, for example, several kilowatts, does not require a radiator, a cooling water pump, a reservoir tank, or a variety of pipes that form a cooling system in a water-cooled fuel cell system, and heat produced in association with electricity generation can be cooled by air used as a reaction gas. Further, in an air-cooled fuel cell system, pressure loss produced along an air passage is advantageously low. As a result, an air-cooled fuel cell system not only has a simple system configuration in which an auxiliary component is not necessarily a compressor but simply a blower fan but also can reduce electric power consumed by the auxiliary component. In view of the fact described above, an air-cooled fuel cell system is sometimes used in a fuel cell powered motorcycle that requires less power in traveling than that in a four-wheel vehicle and a fuel cell powered vehicle, such as an electric wheelchair and other small electric vehicles.

In a fuel cell powered vehicle, it is necessary to determine the positions where the fuel tank, the fuel cell, and the electric parts are mounted in consideration of safety of the fuel tank for storing hydrogen gas, which is fuel, performance in cooling the fuel cell and the variety of electric parts, leakage of the hydrogen gas, which is fuel, and other safety factors when troubles occur.

However, when a high priority is placed on the shape of the fuel cell powered vehicle determined in consideration of driver's maneuverability and a structure for securely protecting the fuel tank, the electric parts are inevitably disposed in scattered positions. In this case, wire routing between the electric parts is complicated and the length of the wiring increases accordingly, resulting in increase in weight of the fuel cell powered vehicle and hence inefficient use of the output from the fuel cell. Further, in the process of cooling the fuel cell and a variety of electric parts, the flow of coolant is complicated, resulting in inefficient cooling and difficulty in controlling the flow of the coolant.

SUMMARY OF THE INVENTION

In view of the circumstances described above, an object of the present invention is to provide a fuel cell powered vehicle that includes an air-cooled fuel cell, securely protects a fuel tank, provides a high degree of safety from fuel leakage and other accidents, and satisfactorily cool the fuel cell and a variety of electric parts.

To solve the problems described above, the present invention provides a fuel cell powered vehicle includes a vehicle body, a seat disposed above the vehicle body, a rechargeable battery disposed below the seat, an electric power management device disposed below the seat and behind the rechargeable battery, and a fuel cell disposed below the seat and behind the electric power management device.

In preferred embodiments of the above aspect, the following modes may be provided.

It may be desired that the fuel cell has a substantially box-like shape, and an intake surface thereof through which a reaction gas is introduced is oriented toward an upper front portion of the vehicle body.

It may be further desired that an exhaust duct communicates with an exhaust port of the fuel cell, and the exhaust duct having an opening at the rear of the vehicle body.

It may be further desired that a pair of right and left upper frames extending in a front-rear direction of the vehicle body; a pair of right and left lower frames extending in the front-rear direction of the vehicle body; and a fuel tank is disposed in a center tunnel surrounded by the upper and lower frames, and the fuel tank storing fuel for the fuel cell.

It may be further desired that a fuel leakage detector disposed at an upper position in an internal space below the seat.

It may be further desired that a fuel leakage detector disposed in the center tunnel at an upper position in a space in the vicinity of a base valve of the fuel tank.

It may be further desired that a driven wheel disposed behind the fuel tank and below the fuel cell; a frame cover that covers portions below the seat, which are part of side surfaces of the vehicle body; and a partition wall member isolates a device placement space that is partitioned by the seat and the frame cover from a tire house in which the driven wheel is disposed, the device placement space accommodating the rechargeable battery, the electric power management device, and the fuel cell.

It may be desired that a fuel filling port of the fuel tank is disposed outside the device placement space.

It may be further desired that a partitioning wall isolates a space around the fuel filling port from the device placement space in an airtight manner.

The present invention provides the fuel cell powered vehicle that includes the air-cooled fuel cell, securely protects the fuel tank, provides a high degree of safety from fuel leakage and other accidents, and satisfactorily cool the fuel cell and the variety of electric parts.

The characteristics, operations and advantages of the present invention described above will be more apparently understood by the following description made to the preferred embodiment with reference to the accompanying drawings.

DETAILED DESCRIPTION OF THE PREFERRED EMBODIMENT

An embodiment of a fuel cell powered vehicle according to the present invention will be described below with reference to FIGS. 1 to 6. It will be understood that the words describing directions, such as "upper", "lower", "left" and "right", or like terms, are used herein with reference to illustrated states in the drawings or in actually usable state of the electronically controlled throttle apparatus.

Figure 1:
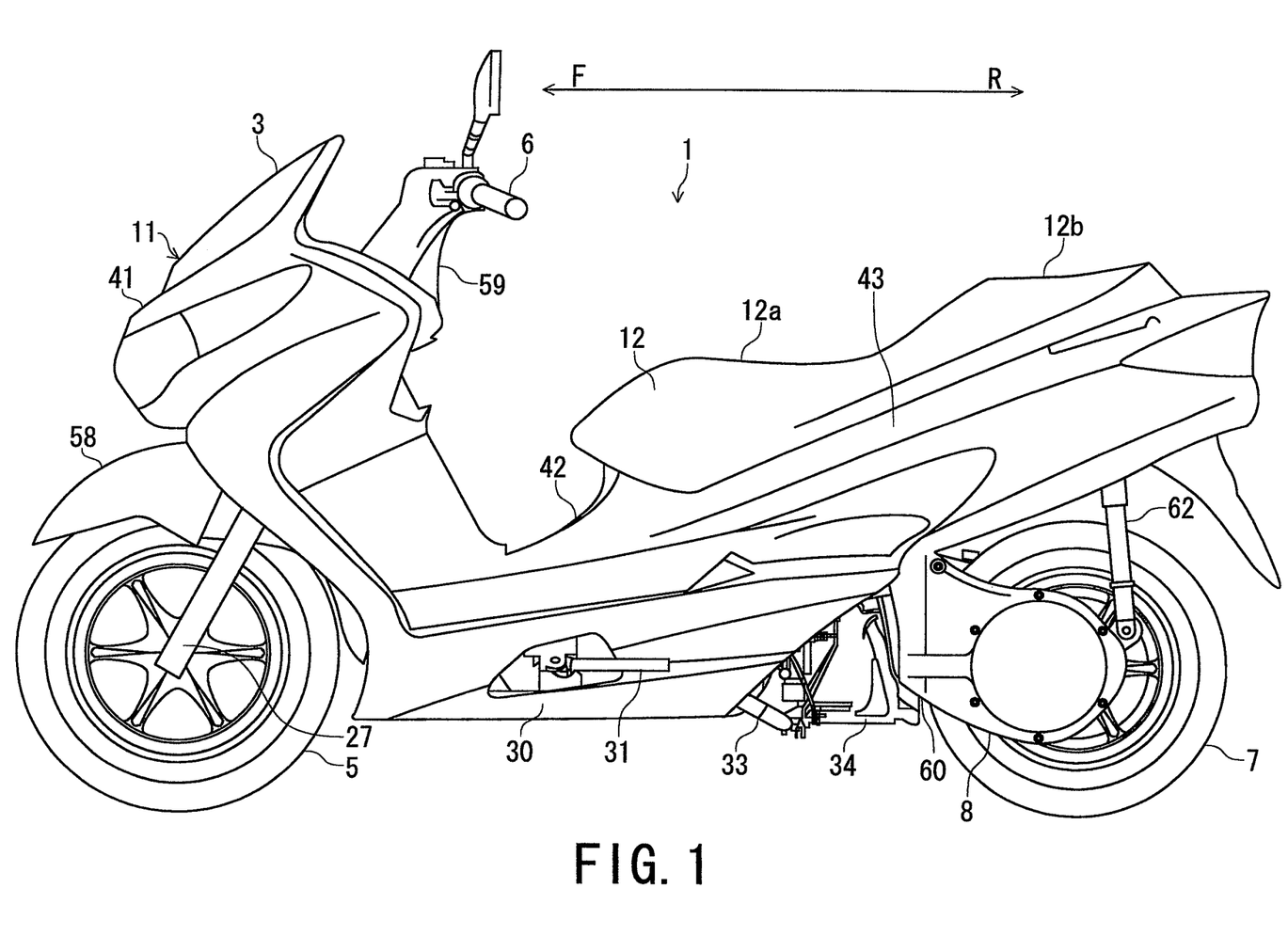
FIG. 1 is a left side view showing a fuel cell powered motorcycle as an example of a fuel cell powered vehicle according to an embodiment of the present invention.
Figure 2:
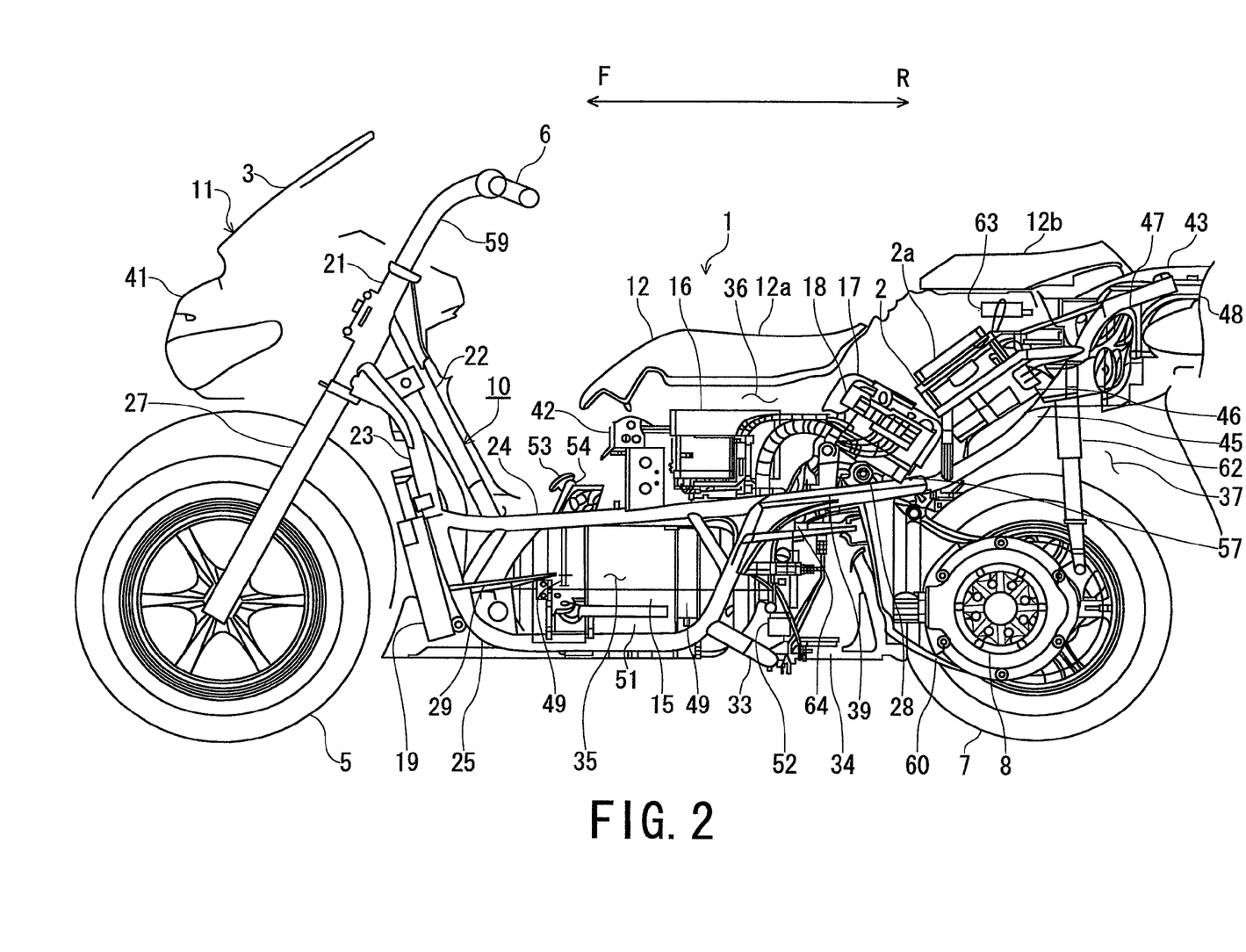
FIG. 2 is another left side view showing the fuel cell powered motorcycle as an example of the fuel cell powered vehicle according to the embodiment of the present invention.

FIGS. 1 and 2 are left side views showing a fuel cell powered motorcycle as an example of the fuel cell powered vehicle according to the embodiment of the present invention. FIG. 1 a left side view showing the exterior of a fuel cell powered motorcycle 1, and FIG. 2 is a left side view showing an internal structure of the fuel cell powered motorcycle 1 with its exterior members partially cut or removed.

Figure 3:
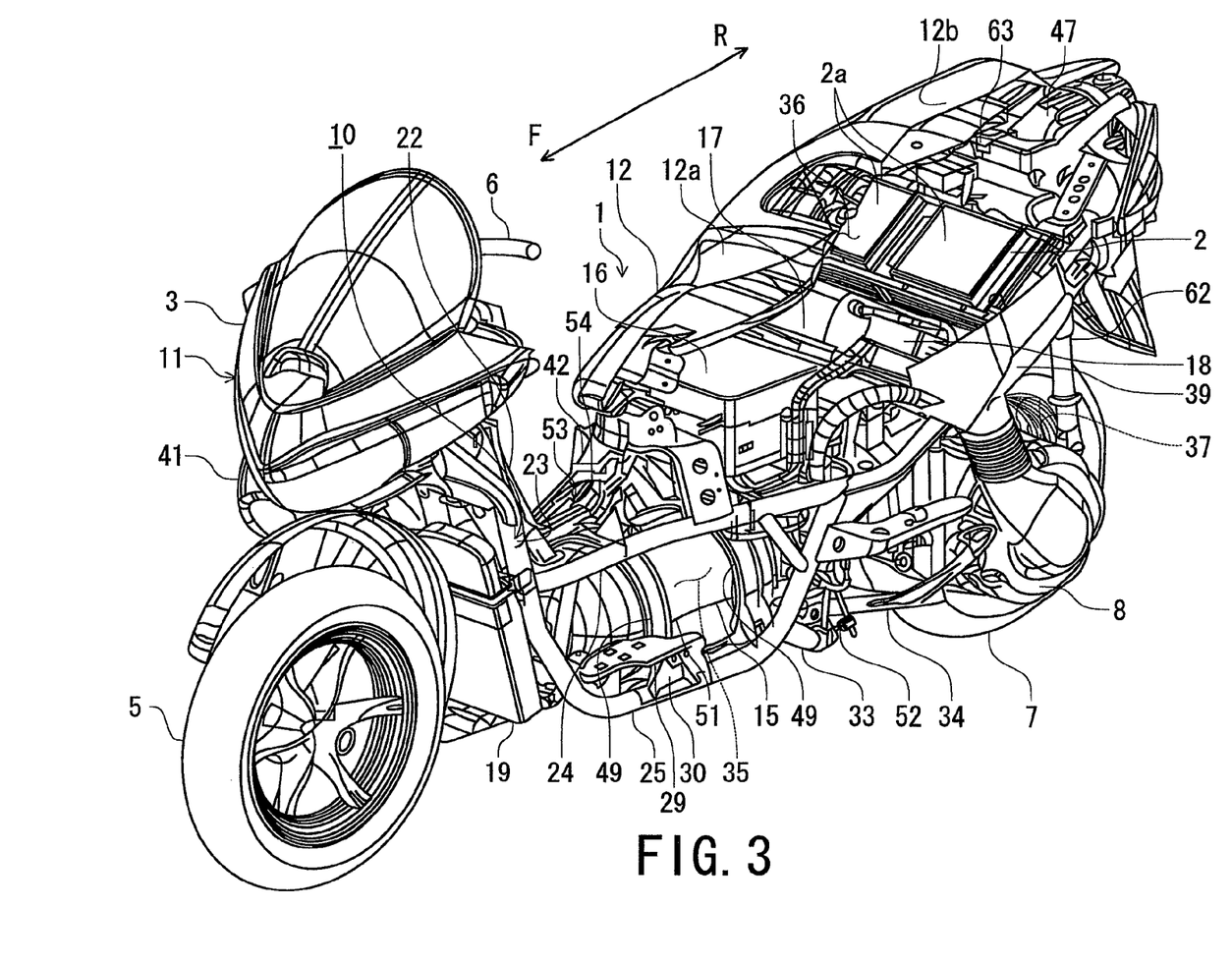
FIG. 3 is a perspective view showing the fuel cell powered motorcycle as an example of the fuel cell powered vehicle according to the embodiment of the present invention with exterior members partially cut.

FIG. 3 is a perspective view showing the fuel cell powered motorcycle as an example of the fuel cell powered vehicle according to the embodiment of the present invention with its exterior members partially cut.

Figure 4:
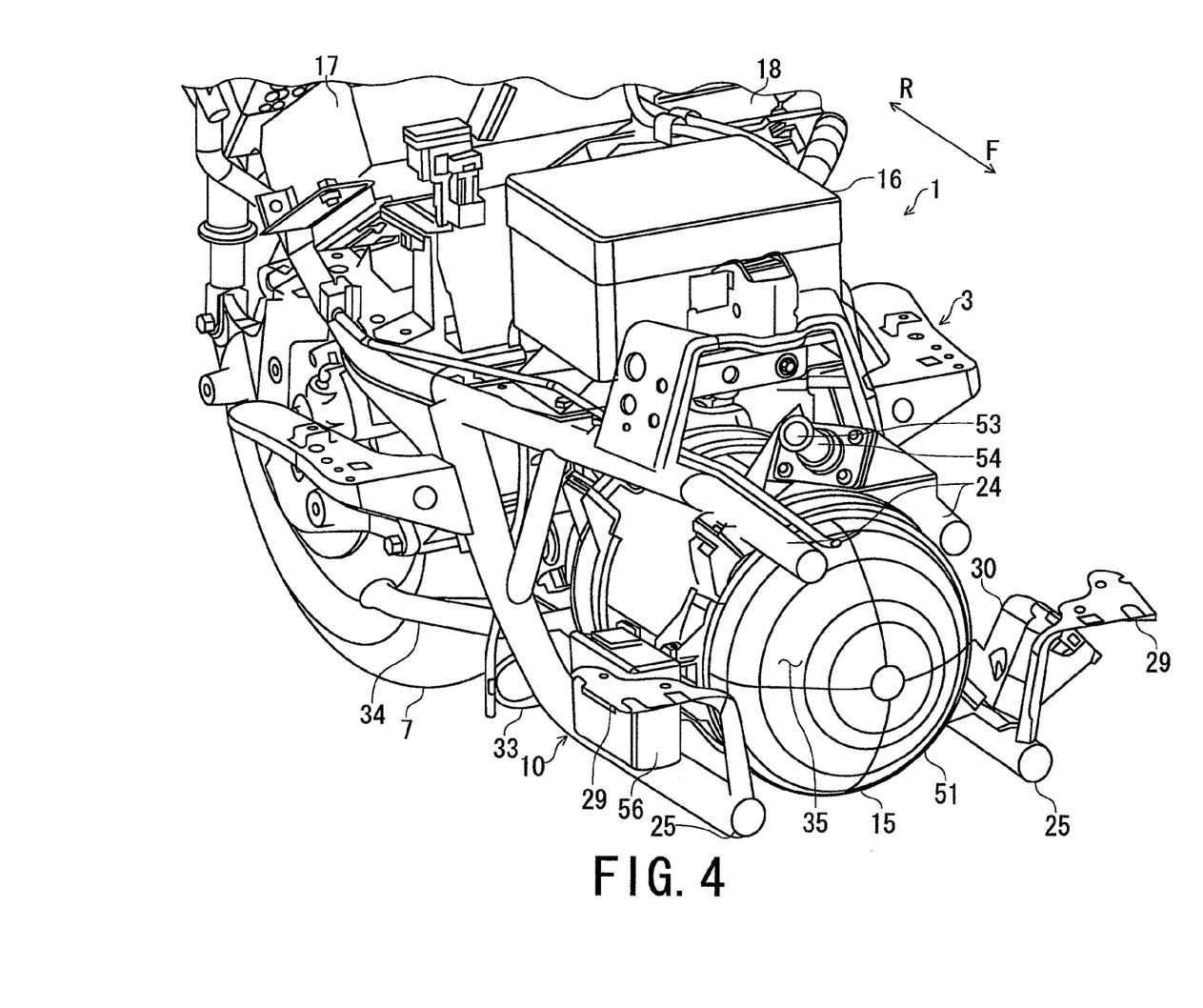
FIG. 4 is a perspective view partially showing the rear half of the fuel cell powered motorcycle as an example of the fuel cell powered vehicle according to the embodiment of the present invention.

FIG. 4 is a perspective view partially showing the rear half of the fuel cell powered motorcycle as an example of the fuel cell powered vehicle according to the embodiment of the present invention.

To make the following description easily understandable, the solid arrows labeled with "F" and "R" are drawn to respectively indicate the front and rear of the fuel cell powered vehicle, that is, the fuel cell powered motorcycle.

As shown in FIGS. 1 to 4, the fuel cell powered motorcycle 1 as the fuel cell powered vehicle according to the present embodiment includes a fuel cell 2 and travels by using electric power produced by the fuel cell 2. The fuel cell powered motorcycle 1 is a scooter-type motorcycle. The fuel cell powered motorcycle 1 further includes a vehicle body 3, a front wheel 5, which is a steered wheel, a handle 6 for steering the front wheel 5, a rear wheel 7, which is a driven wheel, and a motor 8 that drives the rear wheel 7.

The fuel cell 2 is an air-cooled fuel cell system using hydrogen gas as fuel.

The vehicle body 3 includes a frame 10 that is a primary structural member, an exterior member 11 that covers the frame 10, and a seat 12 disposed above the frame 10. The vehicle body 3 includes the fuel cell 2, a fuel tank 15 that stores fuel used by the fuel cell 2 to generate electricity, a rechargeable battery 16 that assists the fuel cell 2 by supplying electricity, an electric power management device 17 that adjusts an output voltage from the fuel cell 2 and distributes the electric power from the fuel cell 2 and the rechargeable battery 16, a motor controller 18 that converts DC (Direct Current) electric power supplied from the electric power management device 17 into three-phase AC (Alternate Current) electric power to operate the motor 8, and a centralized vehicle controller 19 that manages and operates the components described above. That is, a power train of the fuel cell powered motorcycle 1 is a hybrid system including the fuel cell 2 and the rechargeable battery 16.

The frame 10 includes a head pipe 21, a pair of right and left upper down-frames 22, a pair of right and left lower down-frames 23, a pair of right and left upper frames 24, and a pair of right and left lower frames 25.

The head pipe 21 is disposed in a front portion of the vehicle body 3 and pivotally supports fork-shaped front forks 27.

The upper down-frames 22 are connected to an upper portion of the head pipe 21 and inclined downward and rearward toward a rear portion of the vehicle body 3.

The lower down-frames 23 extend from a lower portion of the head pipe 21 substantially straight downward.

The upper frames 24 start from the lower ends of the lower down-frames 23, pass through the lower ends of the upper down-frames 22, and extend in the rear direction of the vehicle body 3 in the front half thereof, and are smoothly inclined upward and rearward toward a rear portion of the vehicle body 3 in the rear half thereof. The seat 12 is disposed above the rear half of the upper frames 24.

The upper frames 24 include a pivot 28 in the rear half of the vehicle body 3.

The lower frames 25 start from the lower ends of the lower down-frames 23, extend toward a lower portion of the vehicle body 3, are bent at the lower end of the vehicle body 3, extend in the rear direction of the vehicle body 3, are bend at a central portion of the vehicle body 3, extend toward an upward, rearward portion of the vehicle body 3, and are connected to the upper frames 24. Each of the lower frames 25 is provided with a rider foot rest 29 disposed on the front side of the lower frame 25. The lower frame 25 positioned on the left of the vehicle body 3 is provided with a side stand bracket 30. The side stand bracket 30 is provided with a swingable side stand 31 that allows the fuel cell powered motorcycle 1 to stand by itself but lean leftward.

The frame 10 further includes a guard frame 33 installed at the rear-side bent portions of the lower frames 25. The guard frame 33 is provided with a swingable center stand 34 that allows the fuel cell powered motorcycle 1 to stand by itself.

The thus configured frame 10 allows the vehicle body 3 to accommodate not only the fuel tank 15 in a center tunnel area 35 surrounded by the pair of right and left upper frames 24 and the pair of right and left lower frames 25 but also the fuel cell 2, the rechargeable battery 16, the electric power management device 17, and the motor controller 18 in a device placement area 36 (device placement space) surrounded by the rear half of the upper frames 24, the exterior member 11, and the seat 12. In the device placement area 36, the rechargeable battery 16, the electric power management device 17, and the fuel cell 2 are disposed in this order from the front side of the vehicle body 3. The motor controller 18 is disposed next to one side of the electric power management device 17, for example, the left side of the vehicle body 3. The rear wheel 7 is disposed in a tire house area 37 positioned behind the center tunnel area 35 in the frame 10 and below the device placement area 36. Provided between the device placement area 36 and the tire house area 37, a partition wall member 39 isolates the above two areas from each other.

The exterior member 11 includes a front leg shield cover 41 that covers the front half of the vehicle body 3, a front frame cover 42 that is positioned in a central upper portion of the vehicle body 3 and covers the upper side of the upper frames 24, and a frame cover 43 that is positioned in the rear half of the vehicle body 3 and covers portions below the seat 12, which are part of the side surfaces of the vehicle body 3. The frame cover 43 along with the seat 12 forms the device placement area 36, which accommodates the fuel cell 2, the rechargeable battery 16, the electric power management device 17, and the motor controller 18. The device placement area 36 is therefore a sealed space surrounded by the seat 12, the frame cover 43, and the partition wall member 39, and providing a vent hole (not shown) at an appropriate location in the frame cover 43 or the partition wall member 39 not only allows the flow of air as a reaction gas supplied to the fuel cell 2 to be readily and reliably controlled but also allows the flow of air as cooling air delivered to electric parts that requires cooling to be readily and reliably controlled. It is noted that the device placement area 36 is not necessarily a completely sealed space.

The seat 12 is positioned in an upper portion of the rear half of the vehicle body 3. The seat 12 is configured in a tandem manner so that a front portion 12a on which a driver is seated is integrated with a rear portion 12b on which a passenger is seated.

The fuel cell 2 is disposed at a rear side in the device placement area 36 partitioned below the seat 12. More specifically, the fuel cell 2 is disposed below the rear portion 12b, on which a passenger is seated, of the seat 12. The fuel cell 2 has a flat, substantially box-like shape and leans forward, and an intake surface 2a of the fuel cell 2 has a reaction gas introduction port and is oriented toward an upper front portion of the vehicle body 3. Specifically, the intake surface 2a of the fuel cell 2 is oriented toward a stepped portion formed between the front portion 12a and the rear portion 12b of the seat 12. The fuel cell 2 can thus be accompanied by a relatively large gap between the intake surface 2a and the seat 12, whereby the atmosphere (air), which is the reaction gas, in the device placement area 36 can be sufficiently sucked into the gap.

The fuel cell 2 includes a fan 45, which sucks as the reaction gas the atmosphere (air) in the device placement area 36 through the intake surface 2a. The fuel cell 2 generates electricity in a chemical reaction between hydrogen gas supplied from the fuel tank 15 and oxygen contained in the air and then discharges wet excess gas through an exhaust port 46. In this process, the air as the reaction gas cools the fuel cell 2. The exhaust port 46 of the fuel cell 2 communicates with an exhaust duct 47.

The exhaust duct 47 is disposed behind the fuel cell 2 and guides the exhaust gas produced in the fuel cell 2 to an exhaust port 48 opened at the rear end of the vehicle body 3. The exhaust duct 47 has a front lower end portion that communicates with the exhaust port 46 of the fuel cell 2 and a rear end portion, desirably a rear upper end portion, having the exhaust port 48 in a position above the portion connected to the exhaust port 46 of the fuel cell 2.

The fuel tank 15 stores hydrogen gas as fuel for the fuel cell 2. The fuel tank 15 is a system capable of storing hydrogen compressed to a high pressure of, for example, approximately 35 MPa. The fuel tank 15 extends in the center tunnel area 35 located in a substantially central lower portion of the vehicle body 3 with the longitudinal axis of the fuel tank 15 aligned with the front-rear direction of the vehicle body 3. The circumference of the fuel tank 15 is therefore surrounded by the pair of upper frames 24 and the pair of lower frames 25, whereby the fuel tank 15 is securely protected from accidents to the fuel cell powered motorcycle 1, such as collisions. The fuel tank 15 is also sandwiched between the right and left foot rests 29 attached to the lower frames 25.

Further, the fuel tank 15 is secured in the center tunnel area 35 with clamp bands 49 installed between the upper frame 24 disposed on one side of the vehicle body 3, for example, the upper frame 24 disposed on the right of the vehicle body 3, and the lower frame 25 disposed on the other side of the vehicle body 3, for example, the lower frame 25 disposed on the left of the vehicle body 3. The clamp bands 49 may alternatively be installed between the upper frame 24 disposed on the left of the vehicle body 3 and the lower frame 25 disposed on the right of the vehicle body 3.

The fuel tank 15 includes a pressure container 51 formed of an aluminum liner composite container, a valve unit 52 (fuel supplying base valve) formed of a base valve (not shown) using an electromagnetic valve integrated with a regulator (not shown), and a fuel filling joint 54 having a fuel filling port 53.

The pressure container 51 is a cylindrical container having hemispherical end plates at both ends.

The fuel filling joint 54 communicates with the pressure container 51 and guides hydrogen gas as fuel through the fuel filling port 53 into the pressure container 51. The fuel filling port 53 is sufficiently spaced apart from the rechargeable battery 16. Specifically, the fuel filling port 53 is disposed outside the device placement area 36, which accommodates a large number of devices, in the vicinity of the upper downframes 22 and covered with the front frame cover 42. More specifically, the fuel filling port 53 is disposed at an upper position close to the front-side end plate of the pressure container 51.

The rechargeable battery 16 is formed of a box-shaped lithium-ion battery. The rechargeable battery 16 is disposed not only at a front side in the device placement area 36 partitioned below the seat 12 but also above the rear-side end plate of the pressure container 51 of the fuel tank 15. More specifically, the rechargeable battery 16 is disposed below the front portion 12a, on which the rider is seated, of the seat 12 and stands substantially erect on an imaginary horizontal plane of the fuel cell powered motorcycle 1.

In addition to the rechargeable battery 16, the fuel cell powered motorcycle 1 further includes a rechargeable battery 56 that works as a power source capable of supplying 12-V electric power to meters (not shown) and lamps (not shown). The rechargeable battery 56 is disposed on one side of the pressure container 51 of the fuel tank 15, for example, on the right of the vehicle body 3. Further, the rechargeable battery 56 is disposed below the fuel filling port 53 and shifted from the valve unit 52 of the fuel tank 15 toward the front of the vehicle body 3. Even in case the hydrogen gas, which is fuel, leaks through the fuel filling port 53, the hydrogen gas will not stay in the vehicle body but diffuses out thereof because the hydrogen gas rises upward in the fuel cell powered motorcycle 1. Further, even in case the hydrogen gas, which is fuel, leaks through the valve unit 52, the hydrogen gas will not stay in the vehicle body but diffuses out thereof because the hydrogen gas travels toward the tire house area 37.

The electric power management device 17 is sandwiched between the rechargeable battery 16 and the fuel cell 2. In other words, the electric power management device 17 is held in the gap between the rechargeable battery 16 and the fuel cell 2 and leans rearward. The motor controller 18 disposed next to the electric power management device 17 is also sandwiched between the rechargeable battery 16 and the fuel cell 2, is held in the gap between the rechargeable battery 16 and the fuel cell 2, and leans rearward, as in the case of the electric power management device 17.

The above arrangement of the rechargeable battery 16, the electric power management device 17, the motor controller 18, and the fuel cell 2 allows the devices that should be disposed next to each other in terms of electric connection to be disposed in the shortest possible distances, whereby wiring lengths between the devices can be shortened and wiring-related weight can be reduced.

The motor controller 18 is disposed next to the electric power management device 17. Specifically, the motor controller 18 is disposed on the left of the vehicle body 3, and the electric power management device 17 is disposed on the right of the vehicle body 3. The motor controller 18 includes cooling fins 57 directed toward the lower side of the vehicle body 3.

The vehicle controller 19 is disposed in front of the lower frames 25 and faces the front-side end plate of the fuel tank 15.

The front wheel 5 is rotatably supported by the front forks 27. The front forks 27 have an elastically expandable, telescopic structure, and support a front fender 58 above the front wheel 5. The handle 6 is connected to an upper end portion of the front forks 27. The front wheel 5, the front forks 27, and the handle 6 are supported in such a way that they can swing around the head pipe 21 and form a steering mechanism 59 of the fuel cell powered motorcycle 1.

The rear wheel 7 is rotatably supported by a swing arm 60 swingably assembled to the pivot 28. The swing arm 60 is elastically supported by the frame 10 via rear suspensions 62.

The motor 8 is a component of the fuel cell powered motorcycle 1 that drives the rear wheel 7. The motor 8 is integrated with the swing arm 60 to form a unitary swing arm. The motor 8 is connected to the rear wheel 7 via a transmission (not shown). The driving force produced by the motor 8 is transmitted to the rear wheel 7 via the transmission.

The vehicle body 3 further includes fuel leakage detectors 63 and 64 that detect leakage of hydrogen gas, which is fuel. Each of the fuel leakage detectors 63 and 64 is formed of a hydrogen gas detector capable of detecting hydrogen gas. The fuel leakage detector 63 is disposed at an upper position in the device placement area 36, that is, an internal space below the seat 12. The fuel leakage detector 64 is disposed at an upper position in the center tunnel area 35 in a space in the vicinity of the valve unit 52 of the fuel tank 15 and in a position close to the tire house area 37. Hydrogen gas is lighter than air, which is the atmosphere in the device placement area 36 and the center tunnel area 35, and can hence be readily detected in case the hydrogen gas leaks from the fuel cell 2, the fuel tank 15, a mid-tube connecting the fuel tank 15 to the fuel cell 2, or other possible portions. In particular, since the device placement area 36 is a sealed space, the fuel leakage detector 63 can quickly sense leakage of the fuel in case the hydrogen gas, which is fuel, leaks from the fuel cell 2 or a tubing system (not shown) in the vicinity thereof. The fuel leakage detector 64 can reliably sense leakage of the fuel in case the hydrogen gas, which is fuel, leaks from the vicinity of the valve unit 52 of the fuel tank 15 even in a situation where an air flow produced when the vehicle travels likely causes leakage fuel to flow into the tire house area 37.

Figure 5:
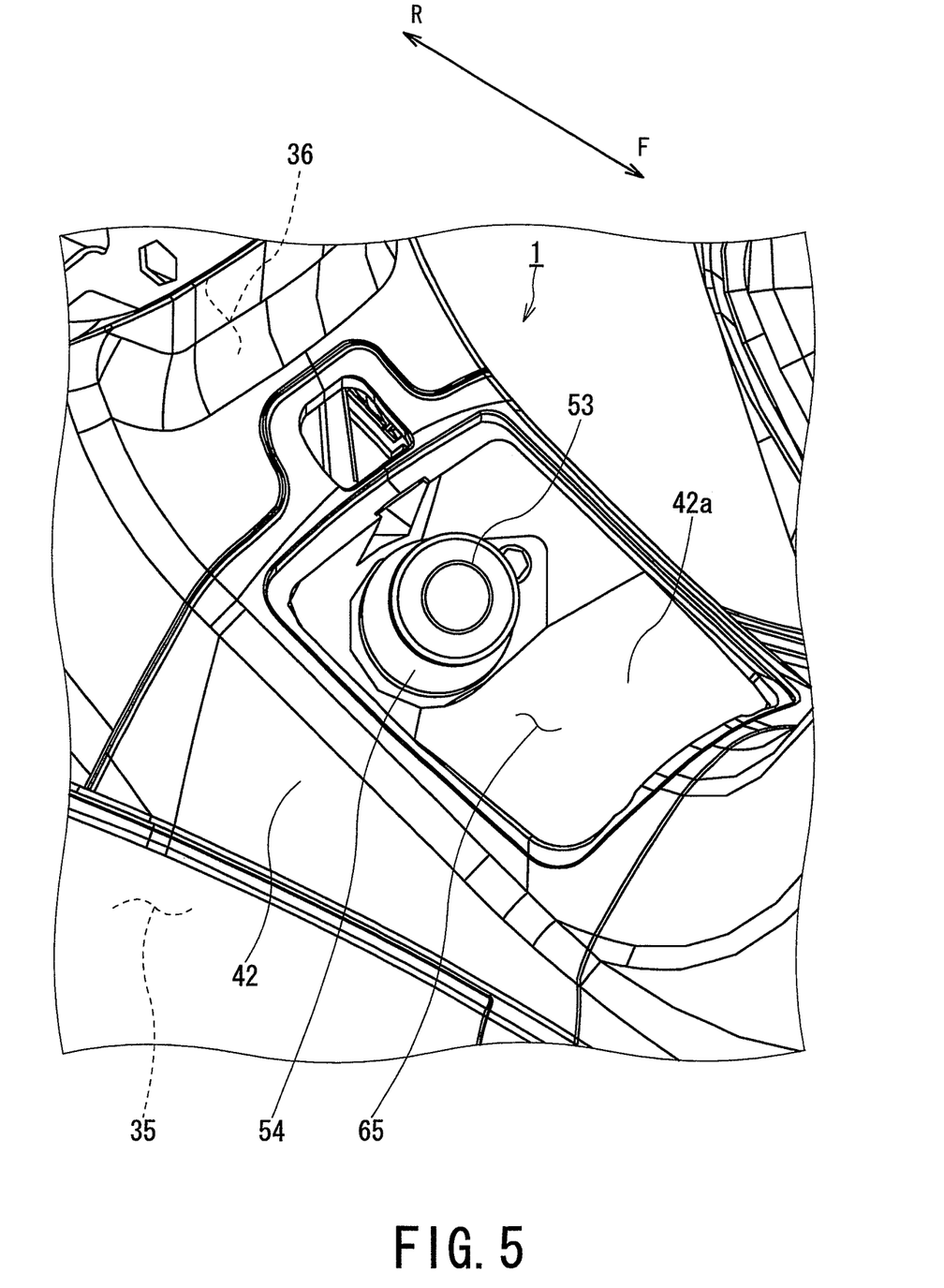
FIG. 5 is a perspective view showing a central portion of the fuel cell powered motorcycle as an example of the fuel cell powered vehicle according to the embodiment of the present invention.

FIG. 5 is a perspective view showing a central portion of the fuel cell powered motorcycle as an example of the fuel cell powered vehicle according to the embodiment of the present invention.

As shown in FIG. 5, the fuel filling joint 54 in the fuel cell powered motorcycle 1 protrudes into a fuel filling port area 65 partitioned by the front frame cover 42. The fuel filling port area 65 is partitioned in an airtight manner by a partitioning wall 42a, which is part of the front frame cover 42, in the vehicle body 3, specifically, between the center tunnel area 35 and the device placement area 36. The fuel filling port 53 of the fuel filling joint 54 is disposed in the fuel filling port area 65.

The fuel filling port 53 is oriented toward an upper portion of the vehicle body 3. When the fuel tank 15 is filled with the fuel with the front frame cover 42 removed, an open space is formed above the fuel filling port 53. As a result, even if the fuel leaks in the fuel filling operation, the leakage fuel will not stay there. Further, since the fuel filling port 53 is disposed in the same manner as a fuel feeding port in a scooter-type motorcycle equipped with a typical gasoline engine is disposed, a user can use the fuel filling port 53 in a usual manner.

Figure 6:
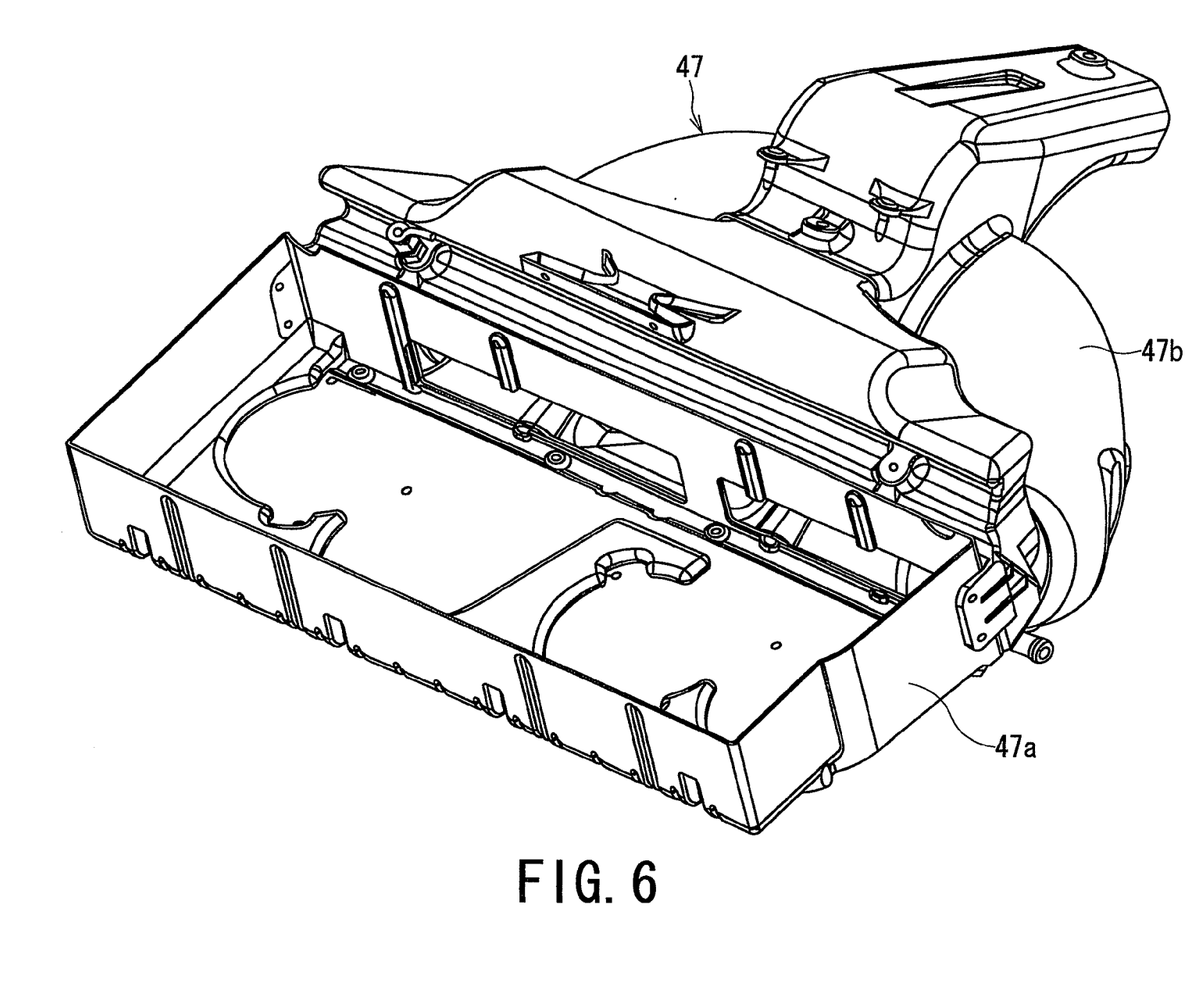
FIG. 6 is a perspective view showing an exhaust duct of the fuel cell powered motorcycle as an example of the fuel cell powered vehicle according to the embodiment of the present invention.
Figure 7:
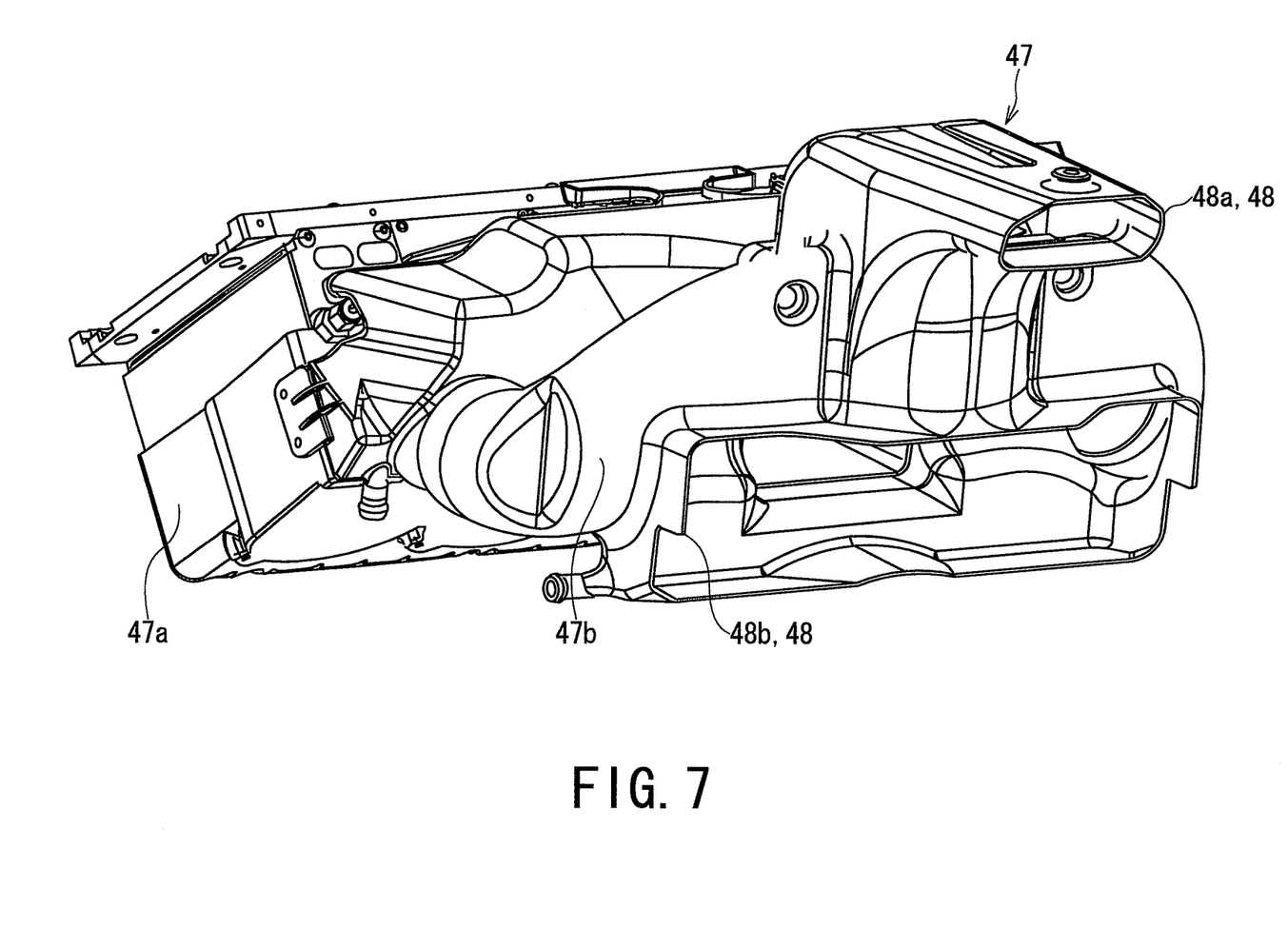
FIG. 7 is another perspective view showing the exhaust duct of the fuel cell powered motorcycle as an example of the fuel cell powered vehicle according to the embodiment of the present invention.

FIGS. 6 and 7 are perspective views showing the exhaust duct of the fuel cell powered motorcycle as an example of the fuel cell powered vehicle according to the embodiment of the present invention. FIG. 6 is a perspective view showing the exhaust duct when the fuel cell powered motorcycle is viewed from the front, and FIG. 7 is a perspective view showing the exhaust duct when the fuel cell powered motorcycle is viewed from the rear.

As shown in FIGS. 6 and 7, the exhaust duct 47 of the fuel cell powered motorcycle 1, which communicates with the exhaust port 46 of the fuel cell 2, includes a box-shaped exhaust gas introducing section 47a that covers a lower end surface of the fuel cell 2 and an exhaust gas discharging section 47b that communicates with the exhaust gas introducing section 47a and guides the exhaust gas toward a rear portion of the vehicle body 3. The exhaust gas discharging section 47b includes a first exhaust port 48a positioned substantially immediately behind the exhaust port 46 of the fuel cell 2 in the vehicle body 3 and a second exhaust port 48b shifted upward in the vehicle body 3 from the portion of the exhaust duct 47 that is connected to the exhaust port 46 of the fuel cell 2. The first exhaust port 48a and the second exhaust port 48b form the exhaust port 48. Since the exhaust duct 47 includes the exhaust port 48, particularly, the second exhaust port 48b, disposed above the portion connected to the exhaust port 46 of the fuel cell 2, a wet excess gas containing hydrogen gas that has not reacted can be reliably discharged out of the vehicle body 3. Further, since the exhaust duct 47 is disposed behind the fuel cell 2 disposed on the rear side in the device placement area 36, that is, on the rear side in the vehicle body 3, and connected to the exhaust port 48 disposed at the rear end of the vehicle body 3, the length of the duct can be shortened and hence loss in the pressure of the exhaust gas from the fuel cell 2 can be reduced.

Figure 8:
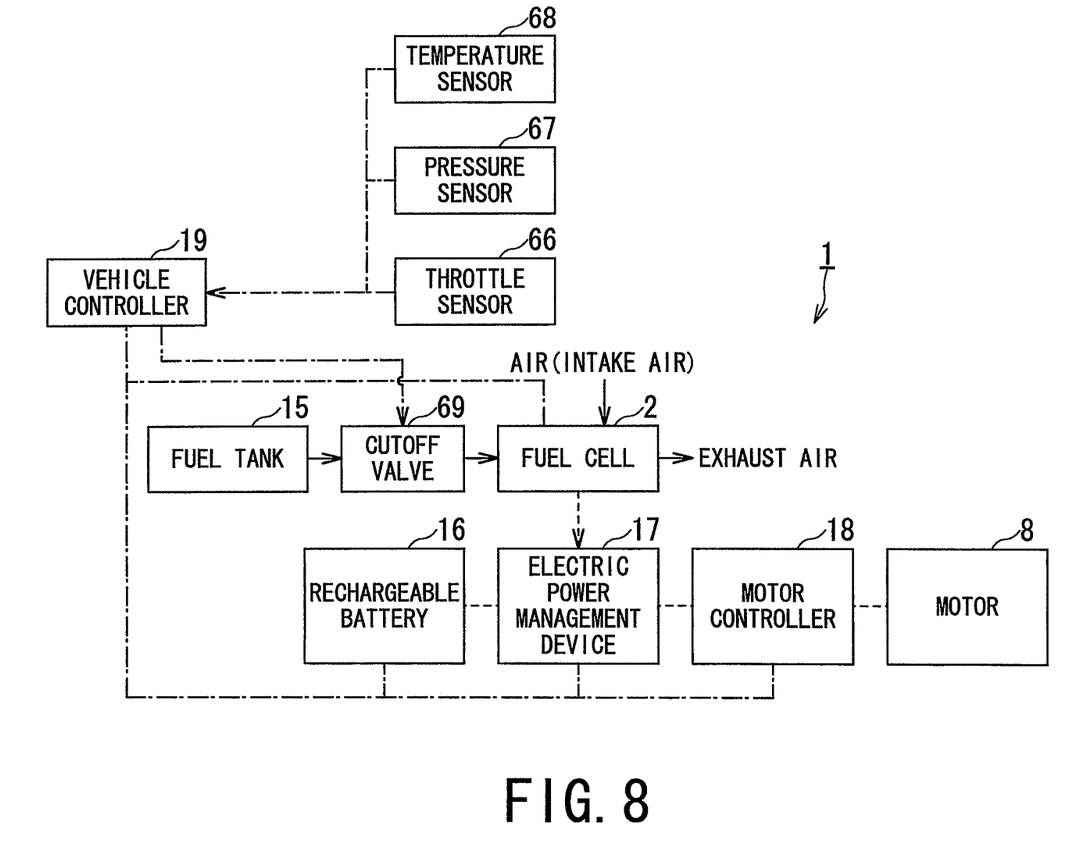
FIG. 8 is a block diagram showing primary devices of the fuel cell powered motorcycle as an example of the fuel cell powered vehicle according to the embodiment of the present invention.

FIG. 8 is a block diagram showing primary devices of the fuel cell powered motorcycle as an example of the fuel cell powered vehicle according to the embodiment of the present invention.

As shown in FIG. 8, the fuel cell powered motorcycle 1 includes the fuel cell 2, the motor 8, the fuel tank 15, the rechargeable battery 16, the electric power management device 17, the motor controller 18, and the vehicle controller 19, and further includes a throttle sensor 66 to which a rider's intention of acceleration is inputted, a pressure sensor 67 that detects the pressure of the fuel supplied from the fuel tank 15 to the fuel cell 2, a temperature sensor 68 that detects the temperature of the fuel supplied from the fuel tank 15 to the fuel cell 2, and a cutoff valve 69 that cuts off the fuel supplied from the fuel tank 15 to the fuel cell 2 in case of fuel leakage. In FIG. 8, the solid arrows indicate the flow of hydrogen gas and air, which are the fuel and the reaction gas, respectively. The broken lines or arrows indicate the flow of electric power. The dashed lines or arrows indicate the flow of control signals. The flow labeled with a line represents bidirectional communication.

The electric power management device 17 controls the amount of electric power generated by the fuel cell 2, converts the electric power delivered from the fuel cell 2 and the rechargeable battery 16 into a 12-V power source, and accumulates the converted electric power in the rechargeable battery 56.

The motor controller 18 not only drivingly controls the motor 8 but also performs regenerative control in which a negative torque produced by the motor 8 when the fuel cell powered motorcycle 1 is decelerated or travels downhill into electric power.

The vehicle controller 19 receives as input values the amount of operation of an accelerator operated by the rider and detected by the throttle sensor 66 and values detected by the pressure sensor 67 and the temperature sensor 68 and performs bidirectional communication with the fuel cell 2, the rechargeable battery 16, the electric power management device 17, and the motor controller 18 by receiving input values representing the states thereof and sending control signals so as to control the operation of the fuel cell powered motorcycle 1.

Specifically, when the fuel cell powered motorcycle 1 travels at a cruising speed or on a flat road, in which period the traveling fuel cell powered motorcycle 1 requires relatively low energy, the vehicle controller 19 supplies the electric power generated by the fuel cell 2 not only to the motor 8 via the electric power management device 17 and the motor controller 18 but also to the rechargeable battery 16 via the electric power management device 17 to accumulate excess electric power unnecessary to drive the motor 8 in the rechargeable battery 16.

On the other hand, when the fuel cell powered motorcycle 1 is accelerated or travels uphill, in which period the traveling fuel cell powered motorcycle 1 requires relatively high energy, the vehicle controller 19 supplies not only the electric power generated by the fuel cell 2 to the motor 8 via the electric power management device 17 and the motor controller 18 but also the electric power accumulated in the rechargeable battery 16 to the motor 8 via the electric power management device 17 and the motor controller 18.

Further, when the fuel cell powered motorcycle 1 is decelerated or travels downhill, the vehicle controller 19 uses the motor 8 as a generator to supply regenerated electric power produced by the motor 8 to the rechargeable battery 16 via the electric power management device 17 and accumulate the regenerated electric power in the rechargeable battery 16.

As described above, in the fuel cell powered motorcycle 1, which is the thus configured fuel cell powered vehicle, the electric power management device 17 is sandwiched between the fuel cell 2 and the rechargeable battery 16, whereby electric parts that should be disposed next to each other in terms of electric connection is disposed in short distances, allowing wiring to be readily routed, the length of the wiring to be reduced, and wiring-related weight and hence the weight of the vehicle body 3 to be reduced. Further, the workability associated with the wiring between the electric power management device 17, the fuel cell 2, and the rechargeable battery 16 are improved and the reliability thereof are enhanced.

Further, the fuel cell powered motorcycle 1, which is a fuel cell powered vehicle, allows a sufficient intake space for the fuel cell 2 is provided in a relatively narrow space below the seat 12 by placing the fuel cell 2 in the device placement area 36 and orienting the intake surface 2a toward an upper front portion of the vehicle body 3.

Still further, since the fuel cell powered motorcycle 1 includes the exhaust duct 47, which communicates with the exhaust port 46 of the fuel cell 2 and opens at the rear end of the vehicle body 3, wet excess gas containing the hydrogen gas from the fuel cell 2 can be quickly discharged. Moreover, since the fuel cell 2 in the fuel cell powered motorcycle 1 is offset rearward in the device placement area 36, the length of the exhaust duct 47 is reduced to a shortest possible value.

Still further, since the fuel tank 15 of the fuel cell powered motorcycle 1 is disposed in the center tunnel area 35, the fuel tank 15 is surrounded by the pair of upper frames 24 and the pair of lower frames 25 and hence securely protected.

Still further, since the fuel leakage detector 63 of the fuel cell powered motorcycle 1 is disposed at an upper position in the internal space below the seat 12, any fuel leakage in the device placement area 36 is reliably and precisely detected.

Still further, since the fuel leakage detector 64 of the fuel cell powered motorcycle 1 is disposed at an upper position in the center tunnel area 35 in a space in the vicinity of the valve unit 52 of the fuel tank 15, any fuel leakage from the fuel tank 15 is reliably and precisely detected.

Still further, since the fuel cell 2 of the fuel cell powered motorcycle 1 is accommodated in the device placement area 36, which is a sealed space surrounded by the seat 12, the frame cover 43, and the partition wall member 39, the electricity is stably generated and hence the fuel cell powered motorcycle 1 travel stably with no influence of the air flow produced during traveling on the fuel cell 2. Since the fuel cell powered motorcycle 1 has a vent hole at an appropriate location in the frame cover 43 or the partition wall member 39, the air flow in the device placement area 36 is readily controlled, and the flow of air as the reaction gas supplied to the fuel cell 2 and the flow of air as the cooling air delivered to the electric parts is readily and reliably controlled.

Still further, in the fuel cell powered motorcycle 1, since the fuel filling port 53 of the fuel tank 15 is partitioned from the center tunnel area 35 and the device placement area 36 in an airtight manner, the hydrogen gas, which is fuel, will not ignite even if the rechargeable battery 16 sparks.

As described above, the fuel cell powered motorcycle 1, which is the fuel cell powered vehicle according to the present invention, includes the air-cooled fuel cell 2, securely protects the fuel tank 15, provides a high degree of safety from fuel leakage and other accidents, and maintains satisfactory ability to cool the fuel cell 2 and a variety of electric parts.

The fuel cell powered vehicle according to the present invention is not limited to the fuel cell powered motorcycle 1 but may be a small electric vehicle including the air-cooled fuel cell 2, such as an electric wheelchair.

While certain embodiments have been described, these embodiments have been presented by way of example only, and are not intended to limit the scope of the inventions. Indeed, the novel systems described herein may be embodied in a variety of other forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

What is claimed is:

1. A fuel cell powered vehicle comprising:
   a vehicle body including an upper and lower frame;
   a seat disposed above the vehicle body;
   a rechargeable battery disposed under the seat;
   an electric power management device disposed under the seat and behind the rechargeable battery; and
   a fuel cell disposed under the seat and behind the electric power management device;
   a fuel tank is disposed in a center tunnel surrounded by the upper and lower frames, and the fuel tank storing fuel for the fuel cell; and
   a motor controller disposed on a side portion of the electric power management device,
   wherein the vehicle further comprises a secondary battery,
   wherein the secondary battery, the electric power management device, and the fuel cell are arranged in the described order from a front side of the vehicle body in a device placement area of the vehicle, the device placement area being surrounded by an exterior member, a seat and a wheel housing area located behind the fuel tank, and
   wherein the electric power management device and the motor controller are both arranged between the secondary battery and the fuel cell.

2. The fuel cell powered vehicle according to claim 1, wherein the fuel cell has a substantially box-like shape, and an intake surface thereof through which a reaction gas is introduced is oriented toward an upper front portion of the vehicle body.

3. The fuel cell powered vehicle according to claim 1, further comprising an exhaust duct communicating with an exhaust port of the fuel cell, and the exhaust duct having an opening at the rear of the vehicle body.

4. The fuel cell powered vehicle according to claim 1, wherein the upper frame of vehicle body further comprises a pair of right and left upper frames extending in a front-rear direction of the vehicle body and the lower frame of the vehicle body further comprises a pair of right and left lower frames extending in the front-rear direction of the vehicle body.

5. The fuel cell powered vehicle according to claim 1, further comprising a fuel leakage detector disposed at an upper position in an internal space below the seat.

6. The fuel cell powered vehicle according to claim 4, further comprising a fuel leakage detector disposed in the center tunnel at an upper position in a space in the vicinity of a base valve of the fuel tank.

7. The fuel cell powered vehicle according to claim 4, further comprising:
   a driven wheel disposed behind the fuel tank and below the fuel cell in the wheel housing area;
   a frame cover that covers portions below the seat, which are part of side surfaces of the vehicle body; and
   a partition wall member isolating the device placement area that is partitioned by the seat and the frame cover from the wheel housing area, the device placement area accommodating the rechargeable battery, the electric power management device, and the fuel cell.

8. The fuel cell powered vehicle according to claim 7, wherein a fuel filling port of the fuel tank is disposed outside the device placement area.

9. The fuel cell powered vehicle according to claim 8, further comprising a partitioning wall isolating a space around the fuel filling port from the device placement area in an airtight manner.

10. The fuel cell powered vehicle according to claim 1, wherein the fuel cell is arranged in a position above a rear wheel.

* * * * *